United States Patent
Kanga et al.

(10) Patent No.: US 11,082,668 B2
(45) Date of Patent: Aug. 3, 2021

(54) SYSTEM AND METHOD FOR ELECTRONIC SURVEILLANCE

(75) Inventors: Rustom Adi Kanga, Gordon (AU); Ivy Lai Chun Li, Gordon (AU)

(73) Assignee: Iomniscient Pty Ltd, Gordon (AU)

(*) Notice: Subject to any disclaimer, the term of this patent is extended or adjusted under 35 U.S.C. 154(b) by 146 days.

(21) Appl. No.: 12/991,303

(22) PCT Filed: May 5, 2009

(86) PCT No.: PCT/AU2009/000557
§ 371 (c)(1),
(2), (4) Date: Feb. 1, 2011

(87) PCT Pub. No.: WO2009/135253
PCT Pub. Date: Nov. 12, 2009

(65) Prior Publication Data
US 2011/0128150 A1   Jun. 2, 2011

(30) Foreign Application Priority Data
May 5, 2008  (AU) ................................ 2008902202

(51) Int. Cl.
*H04N 7/18*  (2006.01)
*G08B 13/196*  (2006.01)

(52) U.S. Cl.
CPC ....... *H04N 7/188* (2013.01); *G08B 13/19669* (2013.01); *G08B 13/19676* (2013.01)

(58) Field of Classification Search
None
See application file for complete search history.

(56) References Cited

U.S. PATENT DOCUMENTS

| | | | | |
|---|---|---|---|---|
| 5,948,038 A | * | 9/1999 | Daly et al. | 701/117 |
| 6,049,636 A | * | 4/2000 | Yang | 382/289 |
| 6,236,735 B1 | * | 5/2001 | Bjorner | G06K 9/2018 250/559.44 |
| 6,411,328 B1 | * | 6/2002 | Franke et al. | 348/149 |
| 6,456,321 B1 | * | 9/2002 | Ito | G06T 9/00 348/143 |
| 6,714,660 B1 | * | 3/2004 | Ohba | 382/103 |

(Continued)

FOREIGN PATENT DOCUMENTS

| | | |
|---|---|---|
| JP | 2005173787 A | 6/2005 |
| WO | 98/08208 | 2/1998 |
| WO | 2003044752 A1 | 5/2003 |

OTHER PUBLICATIONS

Ahmed Elgammal, et al, Background and Foreground Modeling Using Non-parametre Kernal Desity Estimation for Visual Surveillance, Proc. IEEE, vol. 90, No. 7, Jul. 2012.

(Continued)

*Primary Examiner* — Mohammed Jebari
(74) *Attorney, Agent, or Firm* — Fitch, Even, Tabin & Flannery, LLP

(57) ABSTRACT

A system and method for surveillance of a scene comprising the steps of: capturing a scene via at least two image streams; processing the first of the two image streams to detect an act, event or object; and, wherein when an act, event or object is detected, storing portions of the second image stream corresponding to the act, event or object independently of the first image stream.

46 Claims, 10 Drawing Sheets

(56) References Cited

U.S. PATENT DOCUMENTS

| | | | | |
|---|---|---|---|---|
| 7,302,481 | B1* | 11/2007 | Wilson | H04L 63/0281 |
| | | | | 709/224 |
| 7,505,074 | B2* | 3/2009 | Yoshino | H04N 5/23293 |
| | | | | 348/333.11 |
| 9,740,933 | B2* | 8/2017 | Demizu | H04N 7/18 |
| 2002/0054692 | A1* | 5/2002 | Suzuki et al. | 382/100 |
| 2002/0191866 | A1* | 12/2002 | Tanabe | 382/298 |
| 2003/0025800 | A1* | 2/2003 | Hunter | H04N 7/181 |
| | | | | 348/208.13 |
| 2004/0141067 | A1* | 7/2004 | Nakayama | H04N 1/0411 |
| | | | | 348/222.1 |
| 2004/0252193 | A1* | 12/2004 | Higgins | 348/149 |
| 2005/0123201 | A1 | 6/2005 | Nakashima et al. | |
| 2005/0219642 | A1* | 10/2005 | Yachida | H04N 5/23245 |
| | | | | 358/448 |
| 2005/0271264 | A1* | 12/2005 | Ito | G06T 5/006 |
| | | | | 382/154 |
| 2006/0077256 | A1* | 4/2006 | Silvemail et al. | 348/143 |
| 2006/0203903 | A1 | 9/2006 | Shih | |
| 2007/0217761 | A1* | 9/2007 | Chen et al. | 386/86 |
| 2007/0250898 | A1* | 10/2007 | Scanlon | G06T 7/20 |
| | | | | 725/135 |
| 2010/0172543 | A1* | 7/2010 | Winkler | 382/104 |

OTHER PUBLICATIONS

K-P Karmann and A. von Brandt, Moving Object recognition using adaptive background memory in Time Varying Image Processing and Moving Object Recoginiton, Elsevier Science Publishers BV 1990.

C. R. Wern et al., Pfinder: Real-time tracking of human body, IEEE Transactions on Pattern Analysis and Machine Intelligence, 1997.

\* cited by examiner

SYSTEM AND METHOD FOR ELECTRONIC SURVEILLANCE

CROSS REFERENCE TO RELATED APPLICATIONS

This application is a national phase application of International Application No. PCT/AU2009/000557, filed May 5, 2009, designating the United States and claiming priority to Australian Patent Application No. 2008902202, filed May 5, 2008, both of which are incorporated by reference herein in their entirety.

TECHNICAL FIELD

This invention relates to a field of electronic visual surveillance, and particularly to the detection of an unusual act and the identification of the subject of the unusual act using images from the same camera.

BACKGROUND OF THE INVENTION

Electronic surveillance is becoming ever more important, and more widespread. Many roads, buildings, bridges, airports, factories and military installations are protected by electronic surveillance systems.

Electronic surveillance usually is required to be undertaken in real time and continuously. A suspicious object can be a person or vehicle in motion, or equally a stationary object that appears or disappears from the scene. A challenge with all surveillance systems is to effectively detect an unusual act and then perform an identification process, while at the same time continuing the detection process.

Detection requires a wide angle view of the scene. However for Identification one requires a close up view of the object to be identified.

One known approach to this problem is to use a Pan, Tilt and Zoom (PTZ) camera. When the camera detects an event it zooms into the object and can identify it. Of course in zooming, the camera can no longer see the original scene and hence its ability to detect further incidents is lost.

Another approach to this problem is to use two cameras. The first camera observes a scene to detect a suspicious object. Once such an object is detected, the first camera continues to observe the wide angle scene, while the second camera is used to zoom in and identify the object. The second camera must have pan, tilt and zoom capabilities. Even when multiple events are detected only one of the persons/objects of interest can be identified as the second camera can only be zoomed on to one incident at a time.

Both approaches can be defeated by a person familiar with the limitations of PTZ cameras as he can send in a decoy. The PTZ camera would zoom in on the decoy while the real intruder entered the scene on another side.

SUMMARY OF THE INVENTION

In accordance with a first aspect of the present invention, there is provided a method for surveillance of a scene comprising the steps of capturing a scene via at least two image streams; processing the first of the two image streams to detect an act, event or object; and, wherein when an act, event or object is detected, storing portions of the second image stream corresponding to the act, event or object independently of the first image stream.

In one embodiment of the first aspect, the method in accordance with a first aspect, wherein the resolution of the first image stream is lower than the resolution of the second image stream.

In one embodiment of the first aspect, the at least two image streams are captured utilising a single device.

In one embodiment of the first aspect, the first image stream is produced by extracting 1 in n pixels of each image from the second image stream.

In one embodiment of the first aspect, n is any one of the integer values 2, 3, 4, 5, 6, 7, 8, 9 and 10.

In one embodiment of the first aspect, the second image stream is stored in a buffer.

In one embodiment of the first aspect, the at least one portion of the second image stream corresponding to the act, event or object detected is extracted from the buffer.

In one embodiment of the first aspect, the buffer is a circular buffer arranged to overwrite outdated image streams stored in the buffer with recently captured image streams.

In one embodiment of the first aspect, there is provided a further step of identifying the event or object by use of the second image stream.

In one embodiment of the first aspect, the scene is divided into at least one sub-area.

In one embodiment of the first aspect, the step of detecting the act, event or object operates on the at least one sub-area.

In one embodiment of the first aspect, the step of detecting the act, event or object is one of a process of motion detection or non-motion detection.

In one embodiment of the first aspect, the step of identifying the act, event or object is operated on at least one sub-area.

In one embodiment of the first aspect, the object is any one of a person, vehicle, sign, package, animal, device or a combination thereof.

In one embodiment of the first aspect, the at least one of the first or second image streams is displayed on an interface.

In one embodiment of the first aspect, the alarm is generated where the event or object is detected.

In one embodiment of the first aspect, the alarm is at least one of visual alert and an audio alert.

In one embodiment of the first aspect, the alarm is communicated to a remote device.

In one embodiment of the first aspect, the identified act, event or object is highlighted on the interface.

In accordance with a second aspect of the present invention, there is provided a system for surveillance of a scene comprising: at least one camera arranged to capture a scene via at least two image streams; a processor arranged to process the first of the two image streams to detect an act, event or object; and, wherein when an act, event or object is detected, storing portions of the second image stream corresponding to the act, event or object independently of the first image stream.

In accordance with a third aspect of the present invention, there is provided an electronic visual surveillance method utilising relatively lower and higher resolution image data, the method comprising: continuously processing the lower resolution image data of an area of interest to detect the occurrence of an unusual act; generating location data defining a sub-area of said area of interest where an unusual act has been detected; and for each said detected unusual act, identifying a subject from the higher resolution data corresponding to said sub-area; storage and transmission of images in said sub-area.

In accordance with a fourth aspect of the present invention, there is provided an electronic surveillance system comprising: a camera outputting relatively lower and relatively higher resolution image data of an area of interest; and a processor for processing said lower resolution image data to detect the occurrence of an unusual act, for generating location data defining a sub-area of said area of interest where an unusual act has been detected, and, for each detected unusual act, for identifying a subject from the relatively higher resolution data corresponding to said sub-area.

In accordance with a fifth aspect of the present invention, there is provided a computer program including at least one instruction which, when loaded on a programmable device causes the programmable device to perform the method steps in accordance with the first aspect of the present invention.

In accordance with a sixth aspect of the present invention, there is provided a computer readable medium incorporating a computing program in accordance with the fifth aspect of the invention.

In accordance with a seventh aspect of the present invention, there is provided a transmission and reception of a data signal comprising the computer program in accordance with the fifth aspect of the present invention.

In one embodiment, the present invention provides software that enables multiple detections and associated identifications to be done at the same time on a single mega-pixel camera. It does this while optimizing the usage of computing resources by using low resolution images for Detection and high resolution images for Identification.

Existing Motion and Non Motion Detection technologies are used for Detection using a low resolution image to reduce the computing resource that is required. When a detection event occurs a high resolution image of the event itself is cut out from the image and sent to Identification software where the object can be identified.

Using this technique multiple objects can be identified for multiple events that occur around the same time.

BRIEF DESCRIPTION OF THE DRAWINGS

Preferred embodiments of this invention will now be described, by way of an example only, with reference to the accompanying drawings in which.

DETAILED DESCRIPTION OF THE PREFERRED EMBODIMENTS

Definitions

In this specification the term "unusual acts, events or objects" is used broadly, and includes, without limitation, at least:
- an intruder entering an area that he is not permitted to enter;
- a person or vehicle going the wrong way in an area where traffic is permitted in one direction;
- a person exhibiting a specific behaviour, such as running, slipping and falling, loitering, painting graffiti or committing an act of vandalism as well as the graffiti itself and the object that has been vandalized;
- an abandoned bag and the person who left it;
- a stolen object and the person who took it;
- a vehicle that is parked where it should not, or is parked for a period of time that is not permitted;
- a vehicle that has turned or moved in a manner or direction that is considered dangerous or is not permitted, and/or
- a vehicle entering or leaving a specific area.

The term "subject" is intended to mean a person, vehicle or object.

The term "detection" is intended to mean seeing, detecting or flagging the unusual act.

The term "identification" is intended to mean knowing, identifying, analysing or recording who or what is the subject.

Overview

In a first aspect of the present invention, there is provided a method for surveillance of a scene comprising the steps of capturing the scene into a first image stream and a corresponding second image stream, wherein the first and second image stream each represents the scene; processing the first image steam to detect an act, event or object; and, whereupon an act, event or object is detected, storing portions of the second image stream corresponding to the act, event or object independently of the first image stream.

System Implementation

Figure 1:
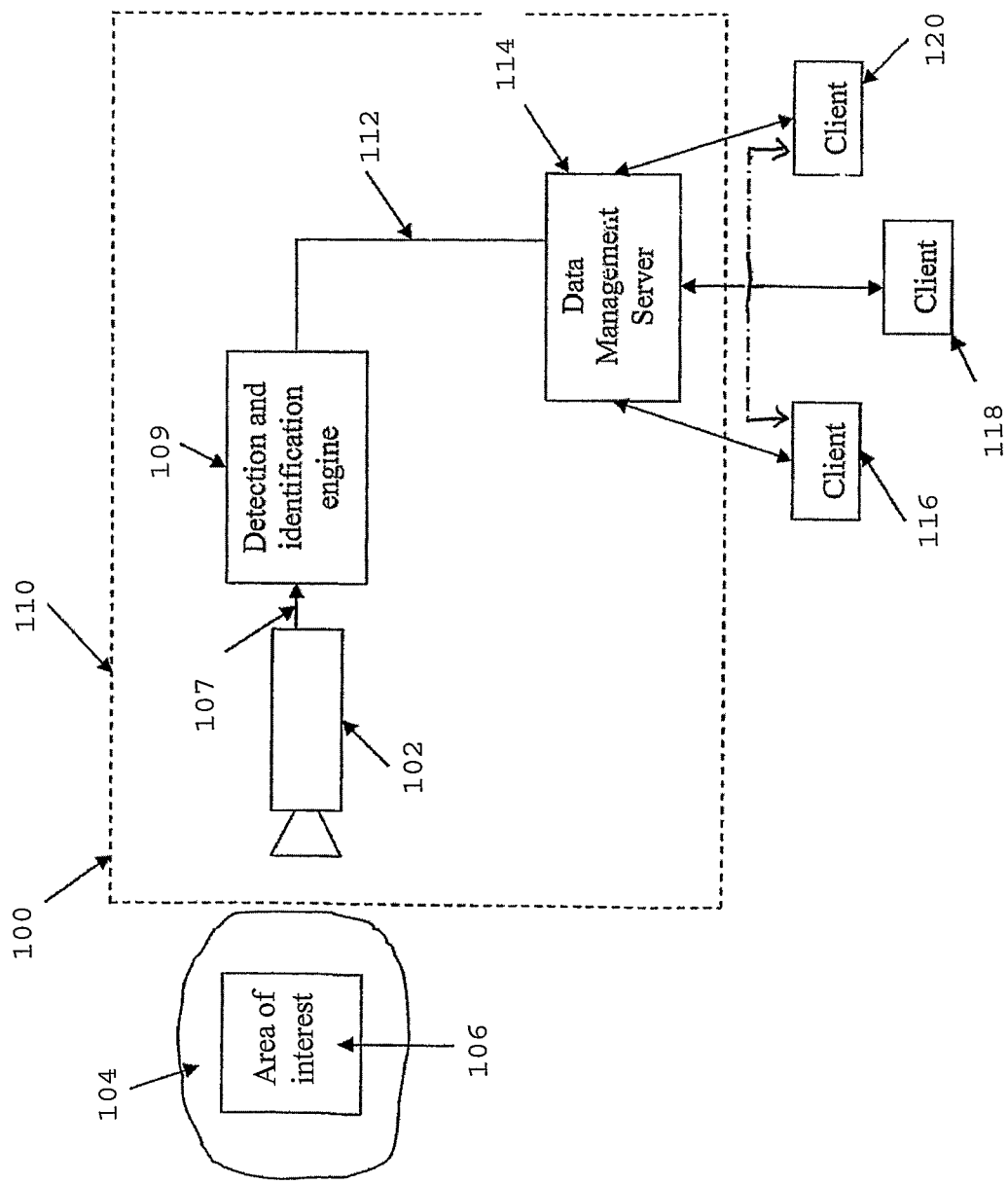
FIG. 1 is a schematic block diagram of an embodiment of the present invention.

With reference to FIG. 1, an embodiment of a system for electronic surveillance is shown. In this embodiment, the system has a surveillance camera 102 arranged to capture a general scene under surveillance. The surveillance camera 102 can be any type of electronic camera arranged to produce a digital or analogue image stream. In examples where the surveillance camera 102 outputs an analogue image stream, the image stream is transformed into a digital output by an analogue to digital converter.

In this embodiment, the general scene of the area under surveillance 104 captured by the camera will have at least one area of interest 106 which defines an area to be specifically monitored for unusual acts, events or objects. For example, these areas can be a crossing, border, no-parking zone, hallway, counter, entry, exit or any other areas where unusual acts, events or object may be detected.

Preferably, in operation, there can be multiple areas of interest within a particular scene 104 to increase the areas of interest under surveillance. For the area of interest 106, the camera (102) generates image data 107 of the area of interest 106. The data 107 is then transmitted to the detection and identification engine 109 for processing.

The data 107 generated may be in two forms, the first being a high resolution image stream of the area of interest 106, the second may be a low resolution image stream of the area of interest 106. In some examples, where the camera 102 is a mega pixel camera capable of producing at least 1 mega pixel in resolution, the higher resolution image stream will be in 1 mega pixel resolution or higher which is the maximum resolution as produced by the camera 102 whilst the low resolution image stream will be in ¼ (one quarter) CIF resolution which is approximately 288×384 pixels. One quarter of CIF resolution is therefore approximately 144× 192 pixels. In order to generate these two image streams, in this example, the camera 102 is arranged to capture a first high resolution image stream for output in a first channel. After this is done, the camera then proceeds to simultaneously generate the lower resolution image stream for output in a separate channel by only capturing 1 out of every n pixels of each image frame of the image stream where n is the factor that determines the fraction by which the high resolution image is to be reduced in size. As the person skilled in the art will appreciate, the determination of how high or how low the resolution of the image streams should be will be dependent on the hardware limitations and usage requirements which can be determined by the person skilled in the art when the system is implemented and deployed.

Once the image data 107 is transmitted to the detection and identification engine 109, the data is further processed to detect any unusual acts, events or objects and identify the subject of the unusual acts, events or objects. The detection and identification engine 109 can be implemented in the form of software, firmware, hardware circuits, or combinations of all three. In this embodiment, the engine 109 is implemented as software operating on a computer connected with the camera 102. In other examples, the engine 109 can be integrated in hardware or programmable hardware circuit within the camera 102. Once the data 107 is provided to the engine 109, the engine performs a detection and identification process as shown in the flow diagram of FIG. 2.

Figure 2:
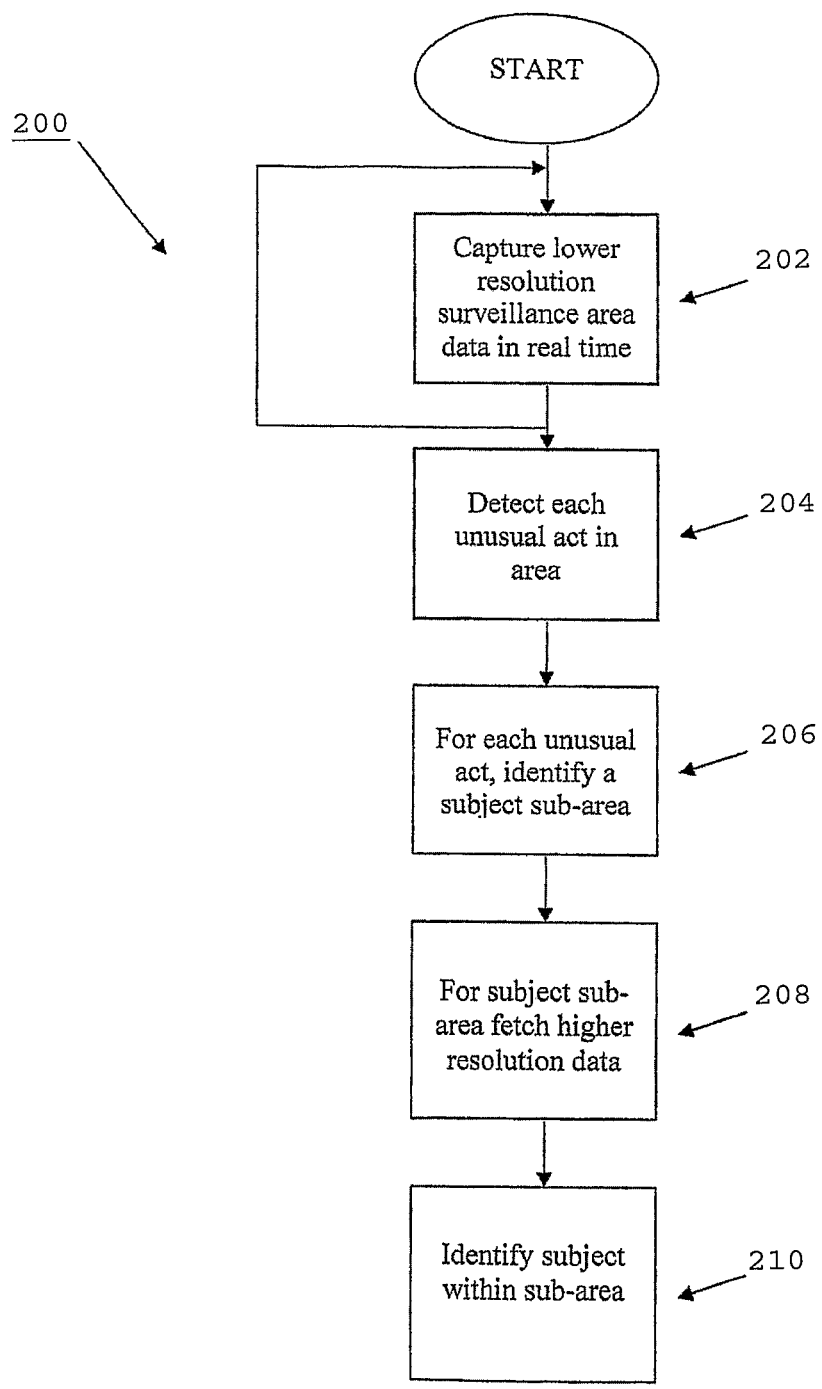
FIG. 2 is a flow diagram of the operation of the system for electronic surveillance in accordance with the embodiment of FIG. 1.

With reference to FIG. 2, low resolution image data is captured by the camera 102 for the area under surveillance (202). The area is divided into individual area of interests 106 and the detection process is executed for each area of interest (204).

Once the detection process detects an unusual act, event or object has occurring in any of the areas of interest 106, a subject sub-area is identified (206). The sub-area is in some examples, defined by the location information or co-ordinates of the unusual act, event or object identified within the areas of interest 106 wherein the unusual act, event or object was detected. By using this location information, higher resolution data from the high resolution image stream corresponding to this sub-area of the low resolution image stream is fetched for the subject sub-area (208) and provided to the identification engine to identify the subject within the sub-area (210). In this example, the higher resolution data will have been stored in a short term memory device or available as an independent data stream to the lower resolution data with the corresponding higher resolution data retrieved for being stored on a long term database.

In some examples, there may be two or more unusual acts within one or more areas of interest at any given point in time, or, in some cases, multiple unusual acts may occur very closely together in time. These multiple unusual acts may be detected and identified within the multiple areas of interest for an area of surveillance. In this embodiment, the system is arranged such that there are no limits to the number of areas of interest which can be kept under surveillance, although computation power will need to increase in order to ensure there is sufficient computing power to execute the required processes.

In this embodiment, once the engine 109 detects that there is an unusual act, event or object the relevant portions of the image data 107 as well as any identification results from the identification process is then sent to the data management server 114 for processing, presentation and storage.

The data management server 114 stores and collates the data received from the detection and identification engine 109. In this embodiment, the server 114 stores the image data flagged as having had an unusual act detected into a database mapped to any specific data relating to the subject identified as well as the time stamp of the unusual act detected. The server 114 is in communication with a number of client computers or electronic devices such as mobile phones, alarm systems or alert transmission apparatuses 116, 118, 120. The client computers or electronic devices 116, 118, 120 receive information from the server 114 regarding the detection of unusual acts and the identified subject, and will act on this information accordingly. In some examples, this may simply be the triggering of an alarm for a user of the client computer, or the transmission of the nature of the detection to a remote device. The client computers 116, 118, 120 also can send requests to the management server 114 specifying desired scenes and areas of interest.

Whilst in FIG. 1, it is only shown that one input from the area of interest 106 is transmitted to the server 114, it will be readily understood that the server 114 can service several such areas under surveillance by multiple cameras at the same time. Furthermore, each client or device connected to the server 114 can receive inputs from multiple servers such as 114 at the same time.

Figure 3:
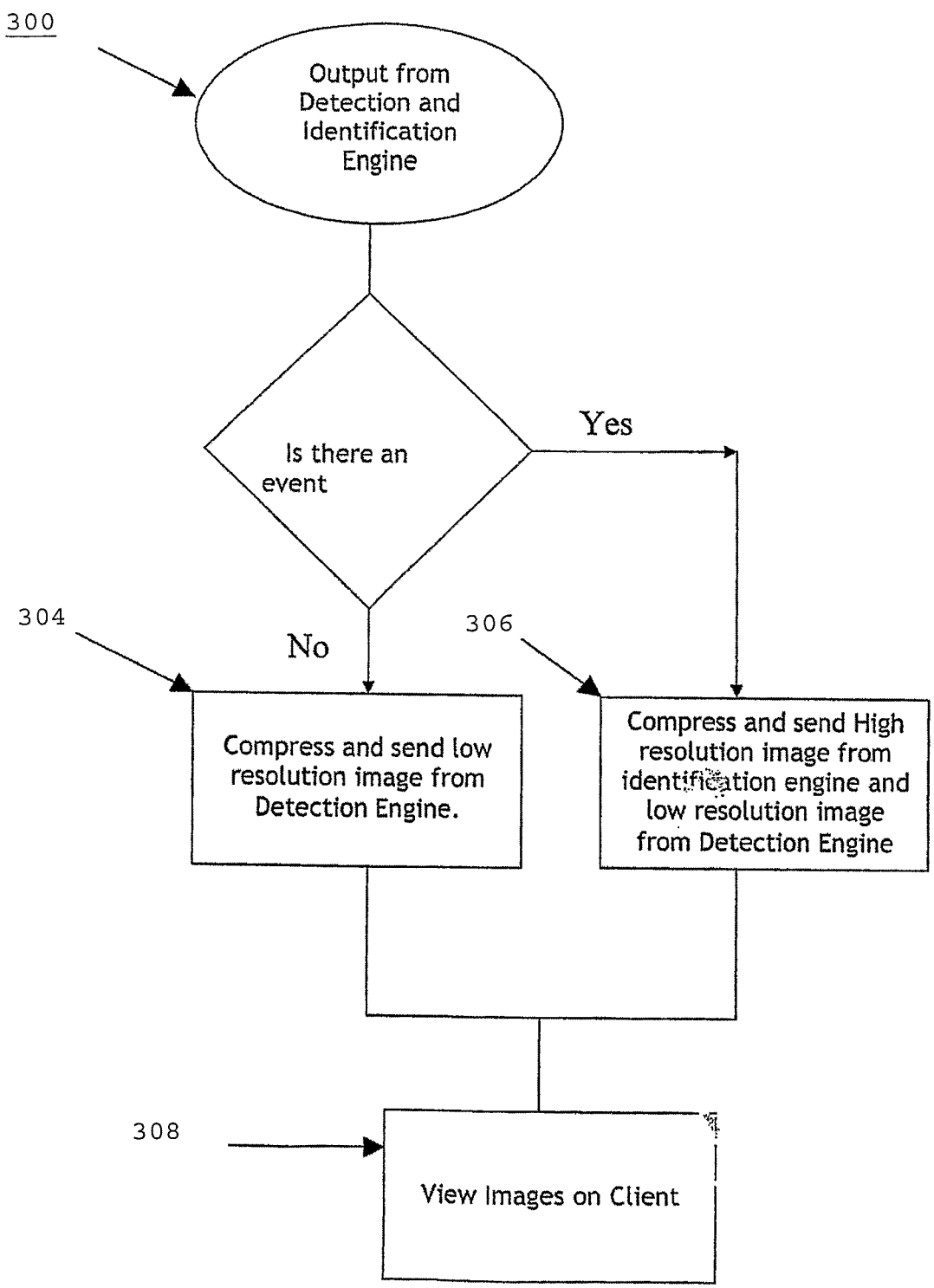
FIG. 3 is a flow diagram of the operation of the data management server in accordance with the embodiment of FIG. 1.

With reference to FIG. 3, an embodiment of the data management server 114 is shown in operation. Once data is provided by the detection and identification engine (300), the data is processed on whether an event was detected. If an event has not been detected, meaning no unusual act was detected, the low resolution image is then compressed and stored in the general backup as part of the long term storage of surveillance data (304).

However, where an event was detected (306), meaning an unusual act was detected by the detector engine 109, the identification engine 109 would have processed the high resolution image associated with that to derive any data resulting from the identification of the person or object. In this instance, the information provided by the detector and identification engine 109 is then compressed and stored in a record on a database for review. This record will represent the instances of a subject having been identified. In some examples, the compression of image data can be conducted in accordance with known standard methods of compression such as MJPEG, MPEG4, H.264 or others that would be suitable.

In this embodiment, as the data management server 114 is connected to a client machine 118, if there has been no detection of an unusual event the lower resolution data corresponding to the overall camera image 104 is compressed and transmitted to the client (308). This allows a user to examine the surveillance data on the client 318.

If there has been an unusual event and an identification of the subject of the unusual event, then the high resolution image relevant to the unusual event detected along with the results of the identification engine 109 concerning the subject (such as the name or attributes of the person, the registration numbers of the vehicle) are compressed and transmitted to the client machine 118 for viewing.

In this embodiment, the transmission of data to the client 118 involves the transmission of low resolution image unless an unusual act or event is detected. In cases where an unusual act, event or object is detected, only portions of the relevant high resolution image are transmitted to the client 118. This arrangement results in significantly less data being transmitted to and processed by the system than if the entire high resolution image were to be transmitted and processed.

In some embodiments, the camera 102, the detection and identification engine 109 and the data management server 114 are implemented into a second unit 110 which can be deployed as a complete unit in remote locations for visual surveillance. In other embodiments, the camera 102, the detection and identification engine 109 or the data management server may be located in different locations suitable to the locations in which the system is deployed. In these embodiments, each component is connected by a communication link to facilitate the transfer of data.

Figure 4:
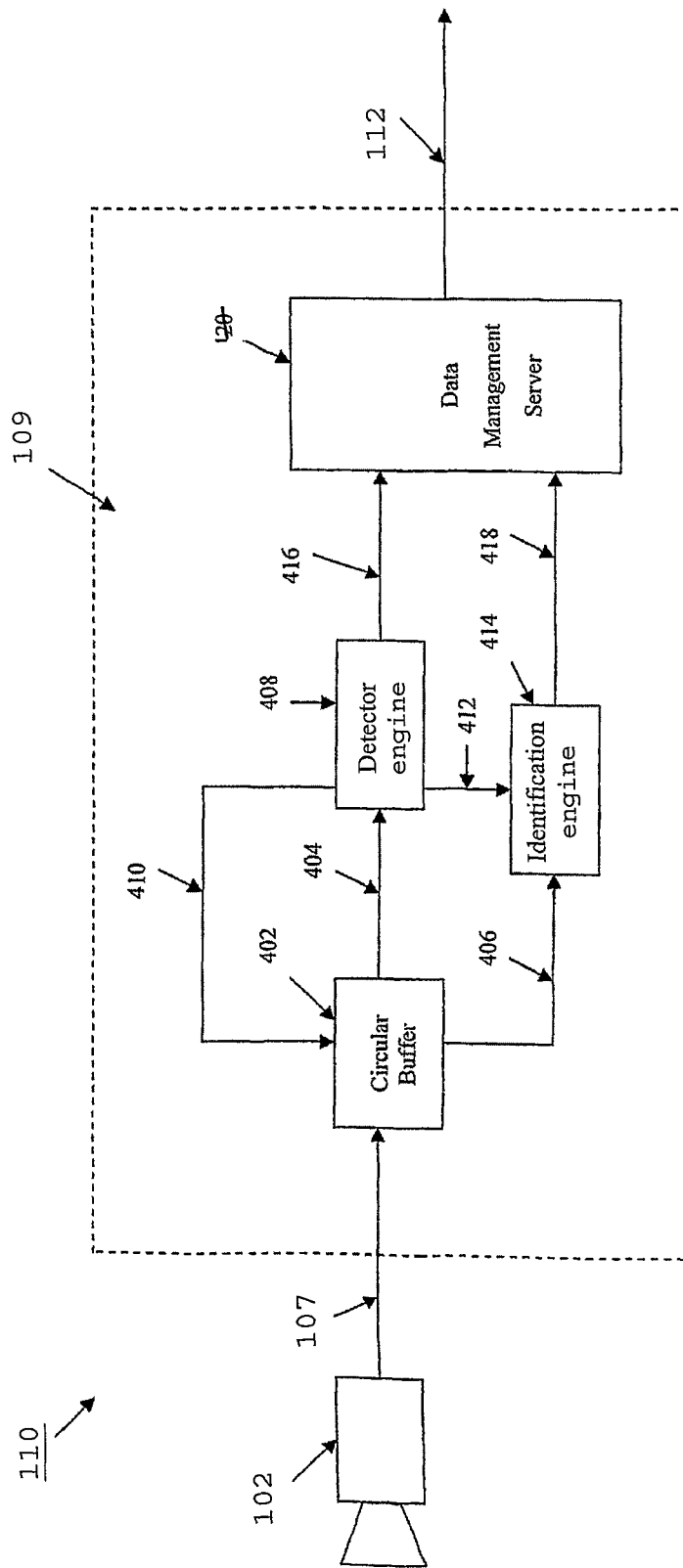
FIG. 4 is a schematic block diagram of another embodiment of the present invention.

With reference to FIG. 4, there is shown a schematic block diagram of another embodiment of the present invention. In this embodiment, the camera 102 maybe a Mobitix, AXIS or AnalyticsReady camera having a pixel resolution of over 1 mega-pixel, although other types of camera are possible. The output data 107 from the camera 102 is provided to a circular buffer 402 which continuously records and overwrites the output data 107 from the camera 102. The circular buffer is also arranged to split the data 107 into two outputs. These are as follows:

(i) a lower resolution output stream 404, achieved by a process of decimation to give a resolution of approximately ¼ CIF (144×192 pixels); and (ii) a higher resolution output 406 that is of substantially the same resolution as the maximum output resolution of the camera 102.

The lower resolution data 404 is input to a detector engine 408 arranged to detect any unusual acts in the area of interest 106. The detector engine 408 is arranged to execute an implementation of any one of a number of known algorithms for detecting unusual acts in the area of interest 106. In this example, the detection algorithms provide the functions of (i) motion detection, and (ii) non-motion detection.

Examples of motion detection algorithms are taught in the following papers, and are herein provided for reference.

Ahmed Elgammal, et al, Background and Foreground Modeling Using Non-parametre Kernal Density Estimation for Visual Surveillance, Proc. IEEE, Vol 90, No. 7, July 2002.

K-P Karmann and A. von Brandt, Moving Object recognition using and adaptive background memory in Time Varying Image Processing and Moving Object Recognition, Elsevier Science Publishers BV 1990.

C R Wern, et al, Pfinder: Real-time tracking of human body, IEEE Transactions on Pattern Analysis and Machine Intelligence, 1997.

These references teach a manner to implement a motion detection algorithm arranged to allow detection of specific events relating to motions of objects under surveillance. In this embodiment, the detection engine is implemented with computing hardware programmed with any of these algorithms. In operation, the detection engine is provided with the low resolution image data 404 and the algorithms are executed to process and detect any unusual events as captured by the camera 102.

An example of non-motion detection is taught in WO 03/044752, entitled Non-motion Detection, corresponding to U.S. application Ser. No. 10/496,424, the contents of which are incorporated herein by reference. In this embodiment, the detector engine 408 is also implemented with the non-motion detection program arranged to process the inputted low resolution image data 404. As the person skilled in the art will appreciate, embodiments of the present invention will operate with any type of motion or non-motion detection algorithm implemented within the detector engine 408.

In operation, the detector engine 408 operates in real time on the lower resolution data 404 to detect any unusual act. Once an unusual act is detected on the resolution data 404, the detector engine 408 then derives a location data for the unusual act detected. The location data is arranged to reference the portion of the image stream 107 wherein the unusual act was detected. In this example, whereupon the unusual act is detected, the detector engine 408 identifies a sub-area of the overall area of interest 106 and then proceeds to identify the corresponding sub-set of pixels for any one frame corresponding to the area of interest 106 where unusual act was detected. The sub-area may range from 1×1 pixels up to the full n×m pixels of the overall area of interest 106.

In some other examples, the sub-area may be extended to be larger than the size of the area of interest 106 where the size of the subject has been pre-specified as being larger than the area of interest 106. This may occur, for example where the area of interest 106 has been specified as a car space during the deployment process of the system, but, a truck significantly larger than the car space encroaches the space. As the subject of a truck being significantly larger than a car was previously specified in the deployment process, the truck is detected to be encroaching on the car space with the detector engine 408 readily extending the sub-area to capture the truck.

Preferably, the sub-area will be sized accordingly to display the object identified with the maximum resolution. In this embodiment, once an unusual act is detected, the detector engine 408 passes a control signal 410 to the circular buffer 402, and a further control signal 412 to an identification engine 414. The control signals 410 and 412 include said sub-area location data, and the control signal 410 causes the circular buffer 402 to output only the higher resolution data corresponding to the sub-area on the output line 406, to be provided to the identification engine 414.

The identification engine 414 is arranged to identify a specific object by cross referencing the image data 406 with a database in order to identify the subject which may have triggered the unusual act detected. In this embodiment, the identification processing engine 414 is an electronic or computing device having programmed software or specifically coded hardware which implements any one of a number algorithms to identify the subject corresponding to the unusual act. In these examples, the identification techniques are directed to either (i) facial recognition, or (ii) vehicle license plate recognition, or (iii) object recognition, although other forms of identification algorithms are possible.

Facial Recognition is used to identify a person from an image of his face.

Vehicle License Plate Recognition is used to identify a vehicle through reading the actual numbers using an optical character recognition capability.

Object recognition involves determining what an object is based on certain key characteristics. For instance a bag can be differentiated from a luggage trolley based on their key characteristics. The luggage trolley would have wheels on its base, multiple vertical components constituting the frame and one would be able to see through it when it is not loaded. A bag would not have these characteristics.

For each unusual event that is detected, the related detector processing engine output data 416 and the identification processing engine output data 418 are passed through the data management server 420 and thence to the clients 316, 318 and 320.

Alternatively, the circular buffer 402 may output the higher resolution data simultaneously with the lower resolution data, in which case the control signal 410 would not be required.

In some embodiments, the detection and identification engines 408, 414 may run on the same physical computer or chip. However, preferably, each engine 408, 414 can also be implemented on different physical computers or chips. This will have an additional advantage in that the computing loaded for each engine can be distributed to separate hardware.

One of the benefits of an embodiment of the present invention is that at least in an embodiment, the detection of unusual events can be performed on the lower resolution data transmitted from the camera 102. This would minimise the amount of data required to be transmitted or processed and therefore offer a computational advantage. In this embodiment, the higher resolution data from the camera 102 needs to be transmitted and stored on the data management server 114 only when an unusual act or event is detected. Since high resolution data, particularly from a mega pixel camera needs a high storage capacity and significantly more processing time. The Electronic Surveillance system 110 is arranged to store and process the high resolution image only where an unusual act has been detected, thereby minimising the use of storage space and processing power.

As an example of this advantage, an image of high-resolution image at 1 mega-pixel requires about 100 kbytes of storage space. This is more than five times the storage or transmission bandwidth required for a low resolution image, such as a 1 CIF images 288×384 pixels) which is typically less than 20 kbytes. The size of a high image resolution is particularly problematic even though large network bandwidth capacity is becoming more readily available and reducing in price. The approach of operating only on a sub-set of higher resolution data means that a significantly reduced amount of data only needs be transmitted. Where there are 10's or even 100's of such surveillance systems, then such data capacity saving is important in the face of often limited network bandwidth, where the data is passed over existing public network infrastructure.

In these embodiments, the system 100, 400 described above can also be implemented such that the detection process can be performed continuously and does not have to pause for the identification process to be undertaken, which could otherwise result in a significant unusual act not being detected. Additionally, several different unusual acts can be detected at the same time and identification performed virtually simultaneously.

In these embodiments, where the system stores only a small portion of the higher resolution data (corresponding to the sub-area) less storage capacity is required on the computer's hard disk.

Figure 5:
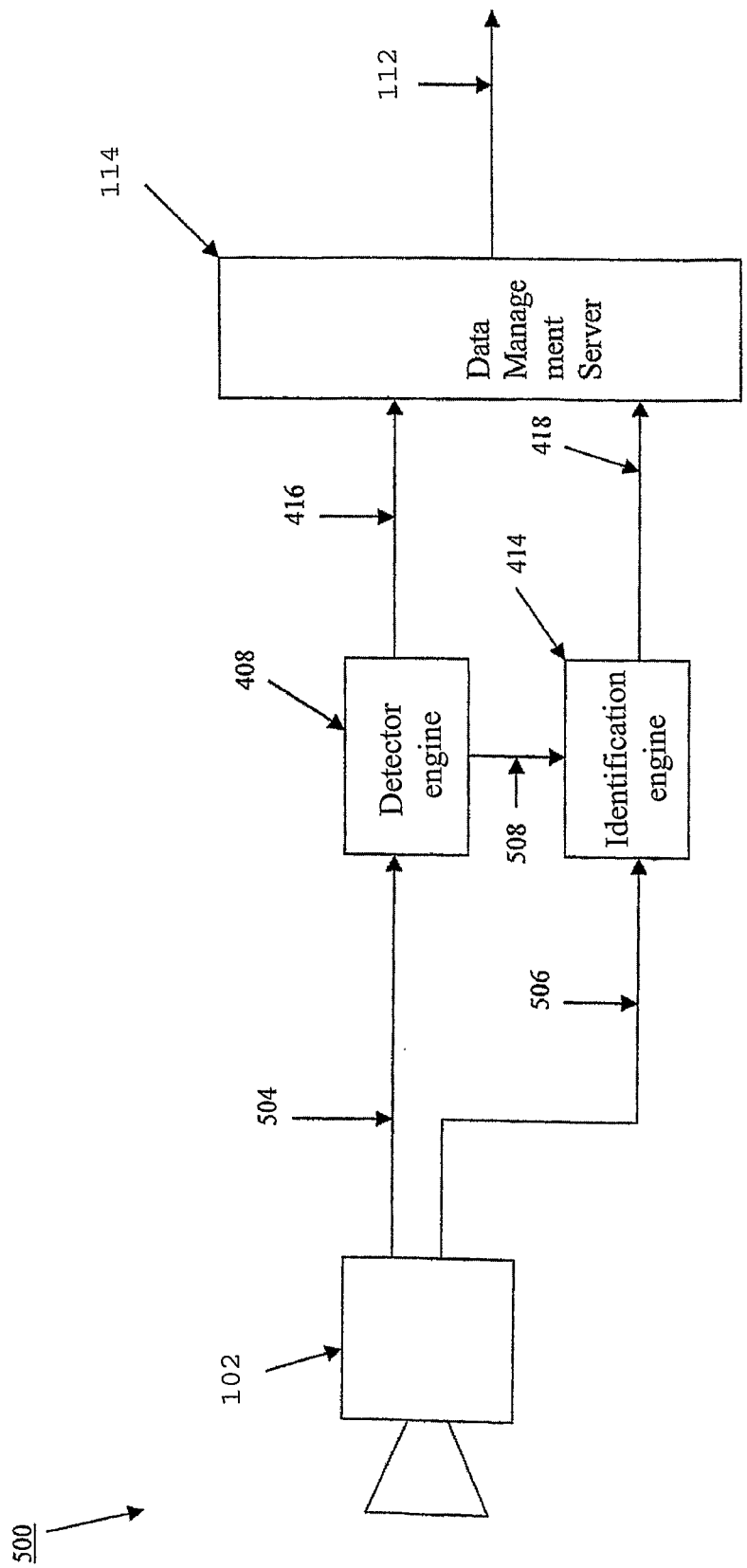
FIG. 5 is a schematic block diagram of yet another embodiment of the present invention.

With reference to FIG. 5, a further embodiment 500 of system is shown. In this embodiment, the camera 102 is arranged to provide two output channels:
  (i) a lower resolution channel 504; and
  (ii) a higher resolution channel 506.

The lower resolution channel 504 is input to a detector processing engine 408. The higher resolution output channel 506 is input directly to an identification engine 414'.

The detector processing engine 408 performs essentially the same function as in the previous embodiment (i.e. the detector engine 408), except that there is a single control output 508 to the identification engine 414 which flags the detection of an unusual act or event and provides the location data to identify the sub-area of interest. In this embodiment, the identification engine 414 receives a continuous stream of high resolution data, but only performs the identification processing when signalled by the detector processing engine 408 on the control line 508.

EXAMPLE

Figure 6:
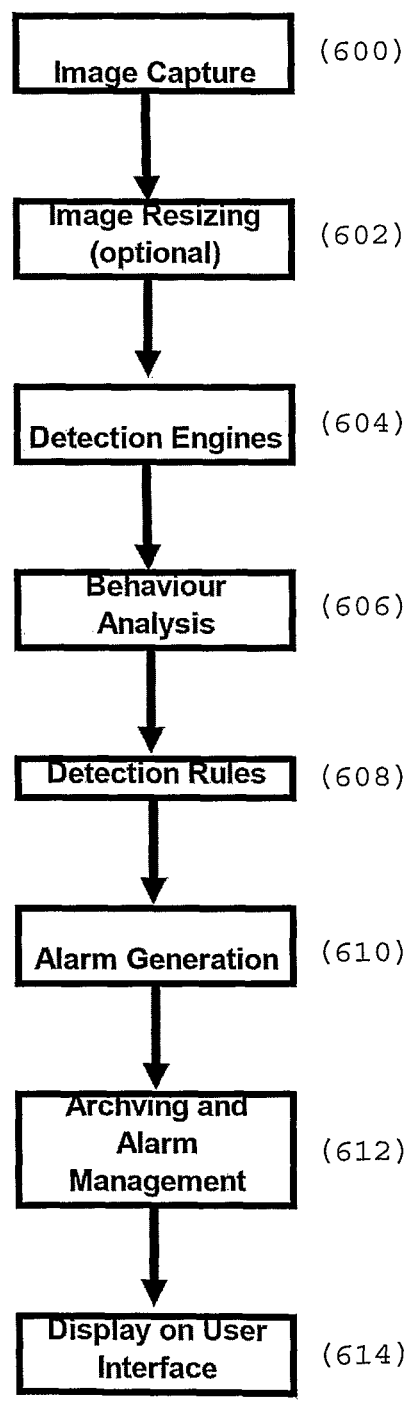
FIG. 6 is a flow diagram of the detection engine and alarm generation module in accordance with an embodiment of the present invention.
Figure 7A:
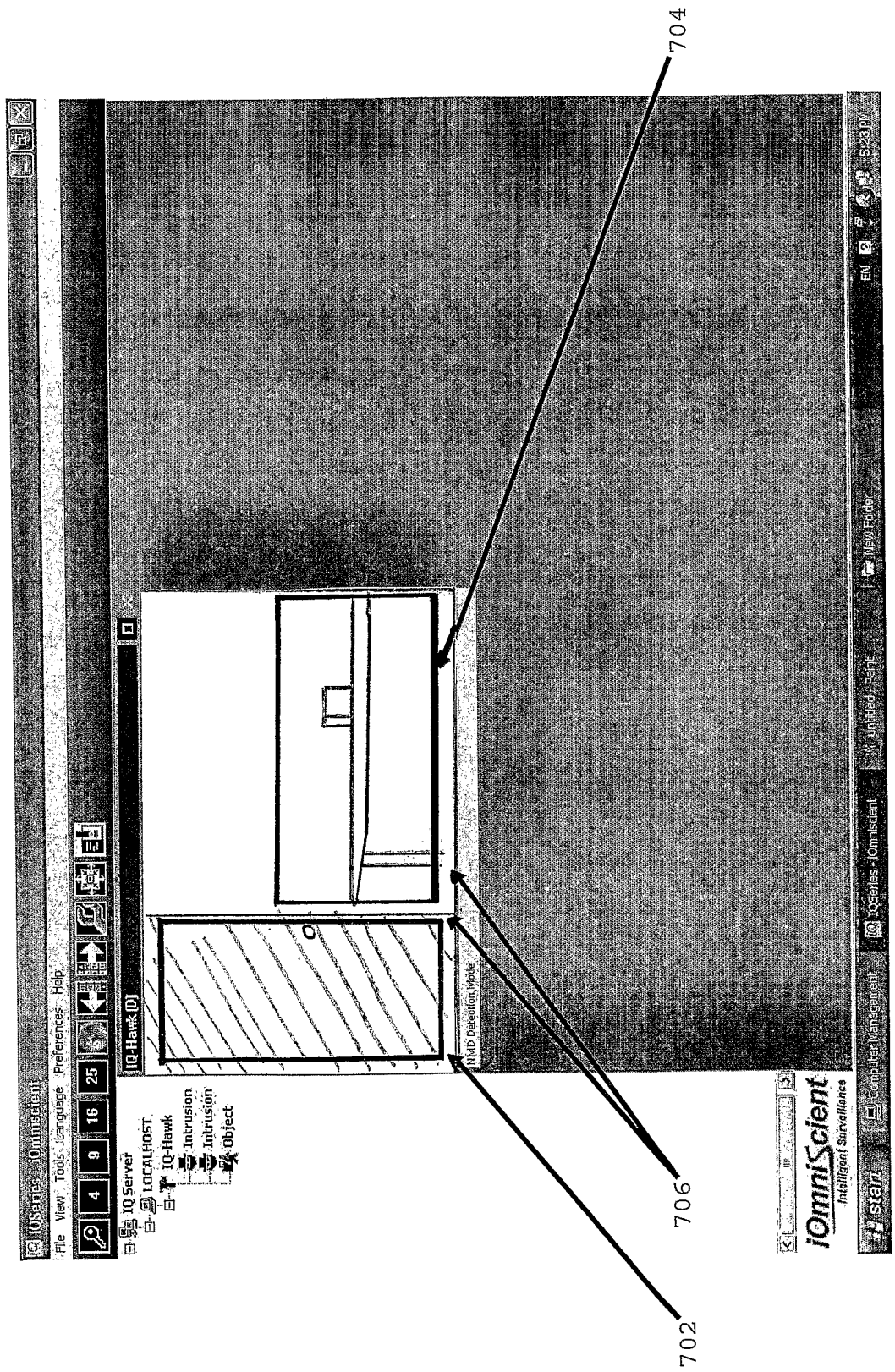
FIGS. 7A-7C are screenshots of the interface of the client in accordance with an embodiment of the present invention.
Figure 7B:
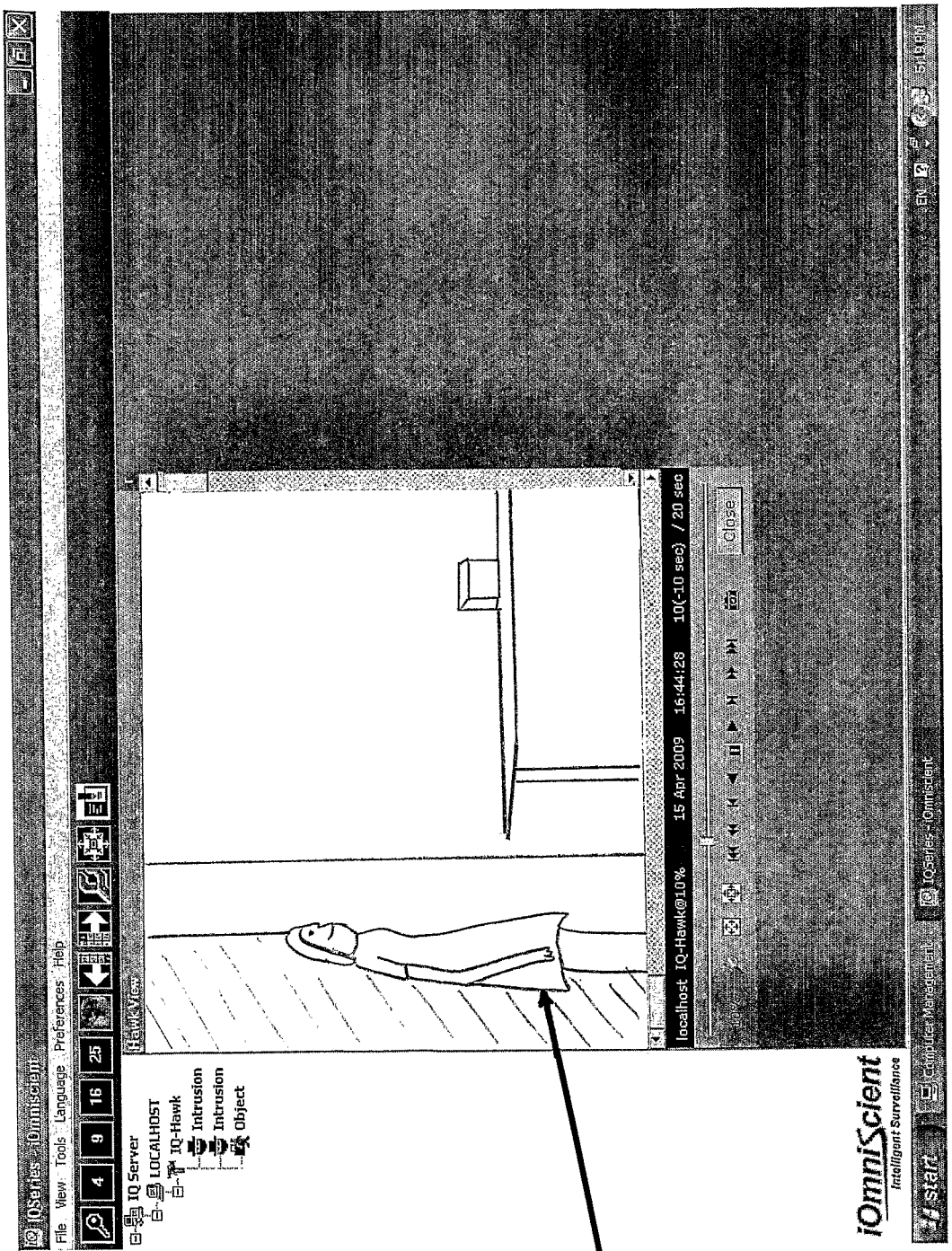
Figure 7C:
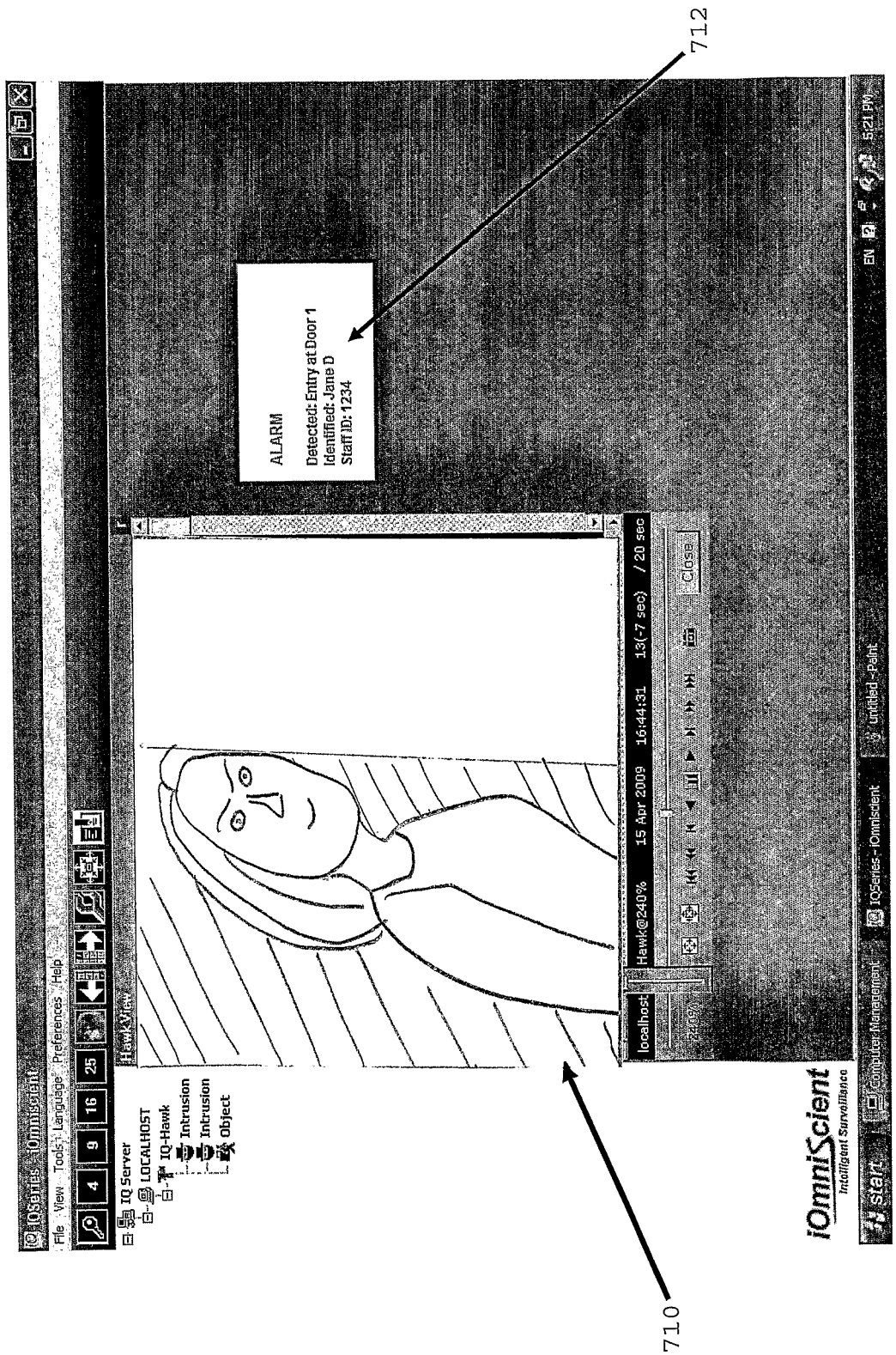
Figure 8:
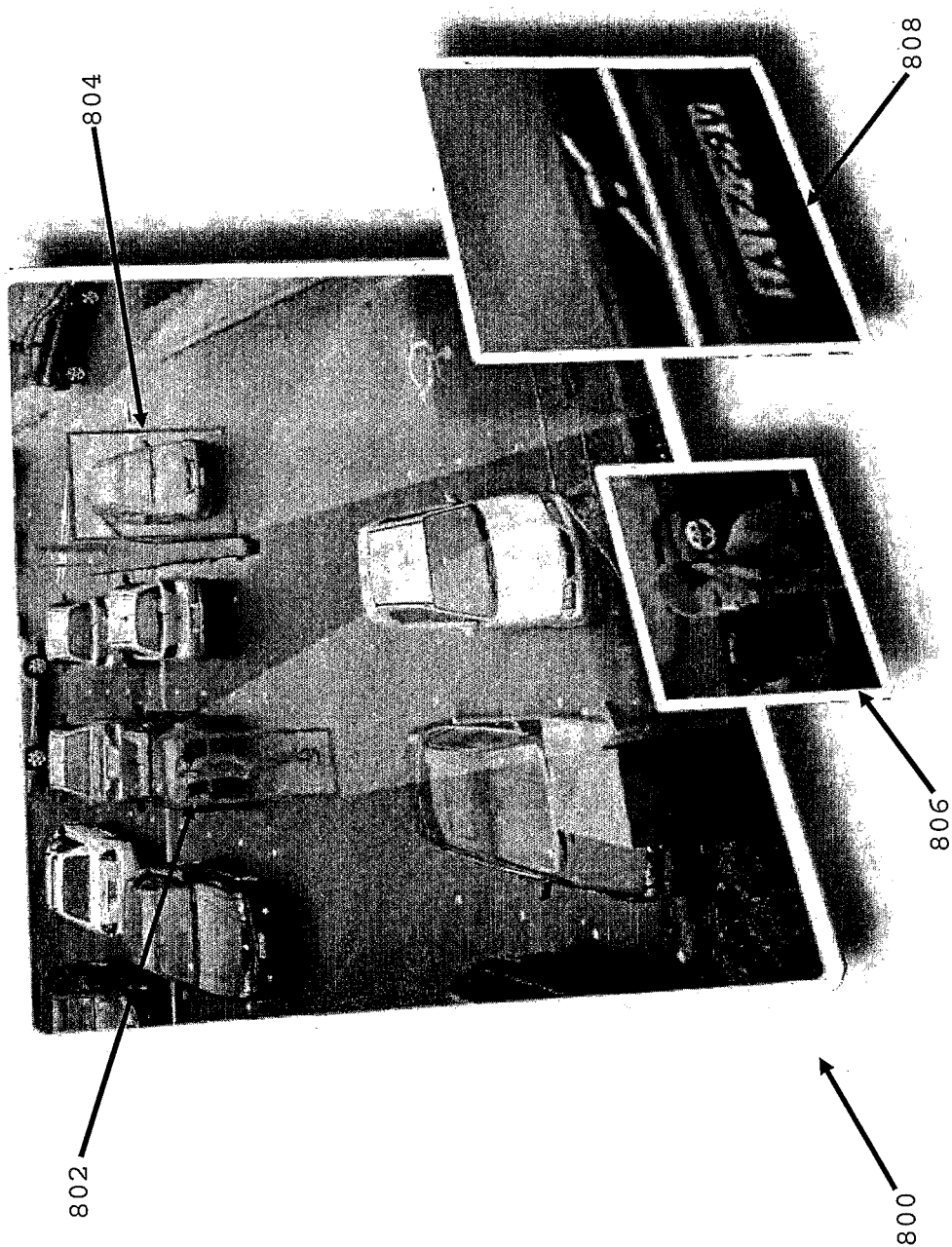
FIG. 8 is an example image captured and results of an embodiment of the present invention.

With reference to FIGS. 6 to 8 an example embodiment of the present invention is shown. In this example embodiment, the camera 102 captures an image (600) and transmits the image to the detection engine 109, 408 (604). If it is necessary, the image data is resized to reduce the resolution of the image captured in order to reduce the processing load on the detection engine. The detection engine 109, 408 will proceed to analyse the behaviour of the image data (606) so as to determine if there are any unusual events or activity captured by the camera 102. As discussed, the behaviour analysis is performed by the monitoring of any changes to each frame or sequence of frames of the captured image. Once a change has been determined, the detection engine compares these changes to check whether the changes fall within one of the detection rules (608).

These detection rules may specify the type of change in image data before an unusual action or event is deemed to have been detected. For example, the changed colour of the background may simply be a change in the colour of the sky due to the time of date or weather changes, and as such is not an deemed to be an unusual event. However, where an image matching the outline of a person moving and passing through a specific line or border may be considered an unusual event. As such, the detection rules may state that a determination in change of image data consistent with the shape of a person passing through a point will be considered as an unusual event and therefore generate an alarm (610).

Once an alarm is generated (610), the relevant image data corresponding to the unusual act, event or object is then stored onto a central server and presented to the client 118. An identification engine may also be called to execute the high resolution portion of the captured image so as to attempt to identify the person or object responsible for unusual event detected.

The alarm and captured images may also be presented to a user interface on a client machine (614). This will allow a user to identify and observe the event and determine what needs to be done to deal with the event. With reference to FIGS. 7A to 7C, an example of a user interface of the client 318 is shown. In FIG. 7A, a low resolution image is displayed on the interface as captured by the camera 102. The image, in this example is broken into two separate areas of interest 702 and 704. The first area of interest 702 defines the door in the background and is an area of interest to detect motion detection. The second area of interest 704 defines the table top and is selected as an area of interest to detect non motion detection.

This arrangement is achieved by a user who would simply draw borders 706 to define each area of interest and then select the corresponding detection suitable for the area of interest. Multiple detection types may be selected for the same areas of interest and multiple areas of interest can be established by the user. Once these settings are established, the system is ready to conduct electronic surveillance on the relevant captured image.

As shown in FIG. 7B, a person 708 opens the door and enters the area of surveillance. At this point, the detection engine is able to detect that a motion is established in the first area of interest 702 and generates an alarm. Whilst an alarm is generated, the high resolution image from the camera 102 is then processed to identify the person or object which was detected. The high resolution image 710 is displayed on the client, whilst a message box 712 is also displayed with the output of the identification engine.

With reference to FIG. 8, an embodiment of the present invention is shown in action. A camera capture 800 is shown and processed by the electronic surveillance system and two specific unusual events are detected in the image. The first event 802 is the presence of an intruder near one of the vehicles whilst the second event 804 is the presence of the vehicle in the no parking zone. As shown, an advantage of the present embodiment is that more than one unusual event can be detected at any one time and thereby overcoming the disadvantage in existing camera surveillance arrangements which will narrow the detection to the first unusual event whilst not detecting the second unusual event.

In this embodiment, the high resolution image of the detected person 806 and vehicle 808 is also recorded into the data management server 114 for further processing to identify the persons or object which triggered the unusual event. In this instance, the intruder's face is recorded for identification purposes whilst the vehicles registration numbers are also recorded from the high resolution image.

Although not required, the embodiments described with reference to the figures can be implemented to file an application programming interface (API) or as a series of libraries for use by a developer or can be included within another software application, such as a terminal or personal computer operating system or a portable computing device operating system. Generally, as program modules include routines, programs, objects, components and data files the skilled person assisting in the performance of particular functions, will understand that the functionality of the software application may be distributed across a number of routines, objects or components to achieve the same functionality.

It will also be appreciated that the methods and systems of the present invention are implemented by computing system or partly implemented by computing systems than any appropriate computing system architecture may be utilised. This will include stand alone computers, network computers and dedicated computing devices. Where the terms "computing system" and "computing device" are used, these terms are intended to cover any appropriate arrangement of computer hardware for implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for surveillance of a scene comprising the steps of:
   capturing a scene under surveillance, via a stream of sequential high resolution image frames;
   producing a high resolution image stream from the captured sequential high resolution image frames, the high resolution image stream including data captured from the entire scene under surveillance;
   producing a low resolution image stream by capturing a reduced number of pixels from each image frame of sequential high resolution image frames;
   storing the high resolution image stream in short term storage as an independent data stream to the low resolution image stream;
   detecting one or more acts, events or objects within the captured scene under surveillance using a detection routine;
   the detection routine comprises processing the sequential frames of the low resolution image stream by applying one or more of a number of algorithms, to detect changes in image data of the sequential image frames of the low resolution image stream which are associated with one or more of a plurality of different types of acts, events or objects, wherein the detected changes are not restricted to changes associated with a motion of an item or an entity;
   for each detected act, event or object, deriving location data referencing a sub-area within the sequential frames of the low resolution image stream where the act, event or object is detected:
      generating, using the location data referencing the sub-area within the sequential frames of the low resolution image stream for each of the one or more detected acts, events or objects, frame coordinate data defining a sub-frame portion within a frame of the higher resolution image data where an act, event or object is detected,
      using the frame coordinate data, extracting the one or more sub-frame portions from within the frame of the high resolution image stream corresponding to the one or more detected acts, events or objects to produce one or more isolated sub-frame portions; and
      storing the one or more isolated sub-frame portions extracted from within the frame of the high resolution image stream independently of the low resolution image stream in long term memory; and
   producing a video stream by retrieving said one or more isolated sub-frame portions extracted from within the frames of the high resolution stream, and said low resolution image stream, from long term memory, and combining said retrieved high resolution sub-frames and said low resolution image stream;
   wherein both the high resolution image stream and the low resolution image stream are produced before said detecting of one or more acts, events or objects, so that said detection routine is performed on said low resolution image stream; and
   wherein the low resolution image stream, where no act, event, or object is detected, is stored in long term memory.

2. The method in accordance with claim 1, wherein the at least two image streams are captured utilizing a single device.

3. The method in accordance with claim 1, wherein the low resolution image stream is produced by extracting 1 in n pixels from the high resolution image stream.

4. The method in accordance with claim 3, wherein n is an integer value selected from the group consisting of integer values 2, 3, 4, 5, 6, 7, 8, 9 and 10.

5. The method in accordance with claim 1, wherein the high resolution image stream is stored in a buffer.

6. The method in accordance with claim 5, wherein at least one portion of the high resolution image stream corresponding to the one or more acts, events or objects detected is extracted from the buffer.

7. The method in accordance with claim 5, wherein the buffer is a circular buffer configured to overwrite outdated image stream data stored in the buffer with recently captured image stream data.

8. The method in accordance with claim 1, wherein the scene is divided into at least one sub-area and the at least one sub-area is monitored independently for acts, events or objects.

9. The method in accordance with claim 1, wherein detecting the one or more acts, events or objects is one of a process of motion detection or non-motion detection.

10. The method in accordance with claim 1, wherein the at least one act, event or object is selected from the group consisting of a person, a vehicle, a sign, a package, an animal, a device and combinations thereof.

11. The method in accordance with claim 1, wherein at least one of the high resolution image stream or the low resolution image stream is displayed on an interface.

12. The method in accordance with claim 1, wherein an alarm is generated when the one or more acts, events or objects are detected.

13. The method in accordance with claim 12, wherein the alarm is communicated to a remote device.

14. A system for surveillance of a scene comprising:
   at least one camera configured to capture the entire scene under surveillance via a stream of high resolution sequential image frames;
   a processor configured to:
      produce a high resolution image stream from the sequential high resolution image frames;
      produce a low resolution image stream by capturing a reduced number of pixels of each image frame of the high resolution sequential high resolution image frames;
      store the high resolution image stream in short term storage as an independent data stream to the low resolution image stream;
      detect one or more acts, events or objects within the captured scene, by processing a low resolution image stream;
   wherein the processor is further configured to process sequential frames of the low resolution image stream using a detection routine which comprises detecting changes in image data of the sequential frames which are associated with the one or more acts, events or objects within the captured scene, by applying one or more of a number of algorithms to the low resolution image stream, wherein the detected changes are not restricted to changes associated with a motion of an item or an entity and;
   the processor being further configured to, when one or more acts, events or objects are detected, derive location data referencing a sub-area within the sequential frames of the low resolution image stream where the act, event or object is detected, and, generate, using the location data referencing the sub-area within the sequential frames of the low resolution image stream for each of the one or more detected acts, events or objects, frame coordinate data defining a sub-frame portion within a frame of the higher resolution image data where an act, event or object is detected; and
   a data management module configured to:
      store the low resolution image stream, where no act, event, or object is detected, in long term memory;
      using the frame coordinate data, extract one or more sub-frame portions from within a frame of the high resolution image stream that correspond to the detected acts, events or objects to produce one or more isolated sub-frame portions, the one or more isolated sub-frame portions extracted from the high resolution image stream being stored independently of the low resolution image stream; and
      produce a video stream by retrieving said one or more isolated sub-frame portions extracted from within the frames of the high resolution stream, and said low resolution image stream, from long term memory, and combining said retrieved high resolution sub-frames and said low resolution image stream;
   wherein both the high resolution image stream and the low resolution image stream are produced before said processor detecting of one or more acts, events or objects, so that said detection routine is performed on said low resolution image stream.

15. The system in accordance with claim 14, wherein the at least two image streams are captured utilizing a single device.

16. The system in accordance with claim 14, wherein the low resolution image stream is produced by extracting 1 in n pixels from the high resolution image stream.

17. The system in accordance with claim 14, wherein the high resolution image stream is stored in a buffer.

18. An electronic visual surveillance method utilizing sequential image frames formatted in relatively lower and higher resolution image data, wherein the lower resolution image data is produced by capturing a reduced number of pixels from each image frame of the higher resolution image data, the image frames of the higher resolution image data capturing a scene under surveillance, the method comprising:
   storing the high resolution image stream in short term storage as an independent data stream to the low resolution image stream;
   storing the lower resolution image data in long term memory and continuously processing image frames from the lower resolution image data using a detection routine to detect changes in image data of the sequential frames within the low resolution image stream, said detected changes corresponding to one or more detected acts, events or objects within the captured scene, the detected change not being restricted to changes corresponding to a motion of an item or an entity;
   the detection routine comprising detecting the one or more acts, events or objects by applying one or more of a number of motion detection and non-motion detection algorithms to detect one or more of a plurality of different types of acts, events or objects;
   deriving, for each detected act, event or object, location data referencing a sub-area within the sequential frames of the low resolution image stream where the act, event or object is detected;
   generating, using the location data referencing the sub-area within the sequential frames of the low resolution image stream for each of the one or more detected acts, events or objects, frame coordinate data defining a sub-frame area within a frame of the higher resolution image data where an act, event or object is detected;
   extracting the sub-frame area of the higher resolution image data using the frame coordinate data to provide an isolated sub-frame area;

storing the isolated sub-frame area extracted from the higher resolution image data independently of the lower resolution image data in long term memory; and producing a video stream by retrieving said isolated sub-frame area extracted from within the high resolution image data, and said lower resolution image data, from long term memory, and combining said retrieved high resolution sub-frame area and said lower resolution image data;

wherein both the high resolution image stream and the low resolution image stream are produced before said detecting of one or more acts, events or objects, so that said detection routine is performed on said low resolution image stream.

19. The method according to claim 18, further comprising temporarily storing the higher resolution image data, and decimating the higher resolution data for use in the continuous processing step, wherein only a sub-frame portion of the stored higher resolution image data corresponding to a defined sub-area is extracted.

20. The method as claimed in claim 18, further comprising receiving the lower and higher resolution image data from separate sources, wherein only a portion of the higher resolution image data corresponding to a defined sub-area is stored in long-term memory.

21. An electronic surveillance system comprising:
a camera configured to output a stream of sequential image frames capturing a scene under surveillance;
a processor configured to generate a higher resolution image data from the stream of sequential image frames, and continually process lower resolution image data generated by capturing a reduced number of pixels from each image frame of the sequential image frames, to detect changes in said image data that correspond to one or more acts, events, or objects within the captured scene, the detected changes not being restricted to change corresponding to a motion of an item or an entity, using a detection routine to detect one or more acts, events or objects in the scene captured in the sequential image frames,
wherein the higher resolution image data is stored in short term storage as an independent data stream to the lower resolution image data;
wherein the detection routine comprises:
  detecting the acts, events or objects by applying one or more of a number of algorithms to detect one or more of a plurality of different types of behaviour;
  for each of one or more detected act, event or object, the processor being arranged to derive location data referencing a sub-area within the sequential frames of the low resolution image stream where the act, event or object is detected, and generate, using the location data referencing the sub-area within the sequential frames of the low resolution image stream for each of the one or more detected acts, events or objects, frame coordinate data defining a sub-frame area within higher resolution image data produced from the sequential image frames where an act, event or object has been detected;
a data management module configured to:
  store the longer resolution image data, where no act, event, or object is detected, stored in long term memory;
  extract the sub-frame area of the higher resolution image data using the frame coordinate data to produce an isolated sub-frame area, and store the isolated sub-frame area extracted from the high resolution image data independently of the lower resolution image data; and
an identification engine configured to identify attributes of the act, event or object from the isolated sub-frame area extracted from the relatively higher resolution image data;
wherein both the high resolution image data and the lower resolution image data are produced before said detecting of one or more acts, events or objects, so that said detection routine is performed on said low resolution image stream;
wherein a video stream is produced, by retrieving said isolated sub-frame area extracted from the higher resolution image data, and said lower resolution image data, from long term memory, and combining said retrieved high resolution sub-frame area and said lower resolution image stream.

22. A non-transitory computer readable medium incorporating instruction which, when loaded on a programmable device, causes the programmable device to perform the method of claim 1.

23. The method in accordance with claim 1 comprising processing the extracted portions of the high resolution image stream to identify attributes of detected acts, events or objects using facial recognition, vehicle license plate recognition or object identification.

24. The method in accordance with the claim 23 comprising comparing attributes of detect acts, events or objects with a reference database to classify the acts, events or objects.

25. The system in accordance with claim 14 comprising an identification engine configured to identify attributes of detected acts, events or objects from the extracted portions of the higher resolution image stream using facial recognition, vehicle license plate recognition or object identification.

26. The system in accordance with claim 25 wherein the identification engine is configured to compare attributes of detected acts, events or objects with a reference database to classify the acts, events or objects.

27. The method in accordance with claim 18 comprising processing the extracted sub-frame areas of the high resolution image data to identify attributes of detected acts, events or objects using facial recognition, vehicle license plate recognition or object identification.

28. The method in accordance with claim 27 comprising comparing attributes of detected acts, events or objects with a references database to classify the acts, events or objects.

29. The system in accordance with the claim 21 wherein the identification engine is configured to process the extracted sub-frame areas of the higher resolution image data using facial recognition, vehicle license plate recognition or object identification.

30. The system in accordance with claim 29 wherein the identification engine is configured to compare attributes of detected acts, events or objects with a reference database to classify the acts, events or objects.

31. The method in accordance with claim 1, wherein the frame coordinate data comprises a sub-set of pixels corresponding to the one or more sub-frame portions.

32. The system in accordance with claim 14, wherein the frame coordinate data comprises a sub-set of pixels corresponding to the one or more sub-frame portions.

33. The method in accordance with claim 18, wherein the frame coordinate data comprises a sub-set of pixels corresponding to the sub-frame area.

34. The system in accordance with claim 21, wherein the frame coordinate data comprises a sub-set of pixels corresponding to the sub-frame area.

35. A method for surveillance of a scene comprising the steps of:
capturing a scene via a stream of sequential image frames;
producing a high resolution image stream from the sequential image frames, and producing a low resolution image stream of the entire captured scene, each image frame of the low resolution image stream having a reduced number of pixels of a corresponding image frame of the sequential image frames, the high resolution image stream being stored in short term storage as an independent data stream to the low resolution image stream, the high and low resolution image streams comprising image data for a concurrent time period;
storing the low resolution image stream in a long term memory;
detecting changes in image data of sequential frames of the low resolution image stream, the detected changes corresponding to one or more detected act, event, or object, the detected changes not being restricted to changes associated with a motion of an item or an entity, by processing the sequential frames of the low resolution image stream using a detection routine which comprises applying one or more of a number of algorithms to detect one or more of a plurality of different types of acts, events, or objects;
for each detected act, event or object, deriving location data referencing a sub-area within the sequential frames of the low resolution image stream where the act, event or object in the captured scene is detected;
generating, using the location data referencing the sub-area within the sequential frames of the low resolution image stream for each of the one or more detected acts, events or objects, frame coordinate data defining a sub-frame portion within a frame of the higher resolution image data where an act, event or object is detected, and
using the frame coordinate data, extracting the one or more sub-frame portions from within the frame of the high resolution image stream corresponding to the one or more detected acts, events or objects to produce one or more isolated sub-frame portions;
storing the one or more isolated sub-frame portions extracted from within the frame of the high resolution image stream independently of the low resolution image stream in long term memory; and
producing a video stream by retrieving said one or more isolated sub-frame portions extracted from within the frames of the high resolution, and said low resolution image stream, from long term memory, and combining said retrieved high resolution sub-frames and said low resolution image stream;
wherein the one or more sub-frame portions are extracted based upon a signal effected by the detection of the one or more acts, events or objects within the low resolution image stream;
wherein both the high resolution image stream and the low resolution image stream are produced before said detecting of one or more acts, events or objects, so that said detection routine is performed on said low resolution image stream.

36. A system for surveillance of a scene comprising:
at least one camera configured to capture a scene via a stream of sequential image frames;
a processor configured to generate a high resolution image stream from the captured sequential image frames, and to generate a low resolution image stream by capturing a reduced number of pixels of each image frame of the captured sequential image frames, the high resolution and low resolution image streams comprising image data of the entire captured stream, the image data covering a concurrent time period;
the processor being further configured to detect one or more changes in image data of the sequential frames of the low resolution image stream, the detected change or changes corresponding to one or more detected acts, events, or objects, the detected changes not being restricted to changes associated with a motion of an item or an entity, by processing the sequential frames of the low resolution image stream using a detection routine which comprises detecting the one or more acts, events or objects by applying one or more algorithms to detect one or more of a plurality of different types of acts, events or objects; and
when one or more acts, events or objects are detected within the captured scene, derive location data referencing a sub-area within the sequential frames of the low resolution image stream where the act, event or object is detected, and, generate, using the location data referencing the sub-area within the sequential frames of the low resolution image stream for each of the one or more detected acts, events or objects, frame coordinate data defining a sub-frame portion within a frame of the higher resolution image data where an act, event or object is detected, and
a data management module configured to
store the low resolution image stream in long term memory and extract one or more sub-frame portions using the frame coordinate data from within a frame of the high resolution image stream that correspond to detected acts, events or objects to produce one or more isolated sub-frame portions, the one or more isolated sub-frame portions extracted from the high resolution image stream being stored in long term memory independently of the low resolution image stream; and
produce a video stream by retrieving said one or more isolated sub-frame portions extracted from within the frames of the high resolution, and said low resolution image stream, from long term memory, and combining said retrieved high resolution sub-frames and said low resolution image stream;
wherein the one or more sub-frame portions are extracted based upon a signal effected by the detection of the one or more acts, events or objects within the low resolution image stream;
wherein both the high resolution image stream and the low resolution image stream are produced before said detecting of one or more acts, events or objects, so that said detection routine is performed on said low resolution image stream.

37. A method in accordance with claim 8, wherein the scene is divided into a plurality of sub-areas and the plurality of sub-areas are monitored independently for acts, events or objects.

38. A method in accordance with claim 1, wherein the step of detecting one or more acts, events or objects comprises detecting a plurality of acts, events or objects occurring at the same time in different parts of the scene, or at different times at the same parts of the scene or different parts of the scene.

39. A system in accordance with claim 14, wherein the scene is divided into a plurality of sub-areas and the processor is arranged to monitor the plurality of sub-areas independently for acts, events or objects.

40. A system in accordance with claim 14, wherein the processor is arranged to detect a plurality of acts, events or objects occurring at the same time in different parts of the scene, or at different times in the same parts of the scene or different parts of the scene.

41. A method in accordance with claim 18, wherein the scene is divided into a plurality of sub-areas and the plurality of sub-areas are monitored independently for acts, events or objects.

42. A method in accordance with claim 18, wherein the step of detecting one or more acts, events or objects comprises detecting a plurality of acts, events or objects occurring at the same time in different parts of the scene, or at different times in the same part of the scene or different parts of the scene.

43. A surveillance system in accordance with claim 21, wherein the scene is divided into a plurality of sub-areas and the processor is arranged to monitor the plurality of sub-areas independently for acts, events or objects.

44. A system in accordance with claim 21, wherein the processor is arranged to detect a plurality of acts, events or objects occurring at the same time in different parts of the scene, or at different times in the same parts of the scene or different part of the scene.

45. A method as claimed in claim 1, wherein the extracted sub-frame portions include data captured prior to occurrence of the detected act, event, or object, the data captured prior to the occurrence satisfying at least one detection rule defining a change in image data before an unusual action or event is deemed to have been detected.

46. A method as claimed in claim 1, wherein the detection routine which detects the acts, events, or objects, processes only the low resolution image stream.

* * * * *